United States Patent [19]

Brandon

[11] Patent Number: 5,496,046
[45] Date of Patent: Mar. 5, 1996

[54] TURBINE SEAL RUB PROTECTION MEANS

[76] Inventor: Ronald E. Brandon, 652 Jubilee St., Melbourne, Fla. 32940

[21] Appl. No.: 350,898

[22] Filed: Dec. 7, 1994

Related U.S. Application Data

[63] Continuation-in-part of Ser. No. 35,223, Mar. 22, 1992, abandoned.

[51] Int. Cl.$^6$ .................................................. F16J 15/48
[52] U.S. Cl. .......................... 277/53; 277/55; 415/174.5
[58] Field of Search .................................. 277/53, 55, 56, 277/DIG. 6; 415/170.1, 174.5, 200

[56] References Cited

U.S. PATENT DOCUMENTS

| | | | |
|---|---|---|---|
| 3,836,156 | 9/1974 | Dunthorne | 277/53 |
| 4,814,236 | 3/1989 | Qureshi et al. | 428/678 |
| 5,137,422 | 8/1992 | Price et al. | 415/200 |
| 5,211,535 | 5/1993 | Martin et al. | 277/53 |

*Primary Examiner*—Daniel G. DePumpo
*Attorney, Agent, or Firm*—Ross, Ross & Flavin

[57] ABSTRACT

In a compressible rotating machine having stationary and rotating elements and employing seal teeth between the stationary and rotating elements capable of being rubbed, worn and damaged by the rotating elements, the improvement which comprises providing a small patch of hard, cutting or grinding material on a small portion of the rotating elements disposed in opposition to the seal teeth and capable of intermittent cutting of the seal teeth during temporary contact so as to avoid mushrooming or of melting of the teeth and to leave them sharp and thin and to prevent grooving of the surface of the rotating elements.

8 Claims, 1 Drawing Sheet

TURBINE SEAL RUB PROTECTION MEANS

This is a continuation-in-part of application Ser. No. 08/035,223 filed Mar. 22, 1992 now abandoned.

BACKGROUND OF THE INVENTION

1. Field of the Invention

This invention relates to rotating machinery and the seals employed therein which can deteriorate and/or cause damage to opposing surfaces during occasional rubbing contact due to misalignment, distortion or vibrations.

2. Description of the Prior Art

A persistent and costly problem for steam turbines and other compressible fluid rotating machinery utilizing seal teeth to minimize leakage is the harmful effect of rubs between stationary and rotating parts. Such rubbing increases the clearance of the seal teeth allowing greater leakage losses and harmful effects on efficiency. Beyond the effect of increased clearance area is the increase in leakage flow coefficient caused by mushroomed and rounded seal teeth. Another harmful effect is the weakened surfaces and grooves caused in the opposing surfaces that are contacted by the seal teeth such as shafts and bucket covers and shrouds. A final harmful effect is the effect of forces applied to the rotating shaft that cause vibration and interfere with balancing procedures.

A variety of steps have been taken to prevent or minimize the problems itemized above. These include improved alignment, corrections of distorted parts, retractable packings, increased seal clearance and refined balance. These are all helpful but cannot completely eliminate occasional seal rubbing and the resultant disadvantages described above.

It has also been proposed to provide a continuous protective coating on rotating parts to protect them against grooving by the seal teeth.

While this may protect the rotating parts, it has an adverse effect on the seal teeth.

For instance, in Martin et al patent #5,211,535, the protective coating 38 is a 360° deposit on the shaft 14. As such, it cannot act as a cutting tool. Rather, when rubbing occurs, it must abrade the teeth to remove them. This is essentially a melting process which creates highly undesirable conditions on the teeth and the rotor. Martin et al states in column 3 lines 13, 14, 15, "the inner shaft 14 includes a layer 38 of abrasive resistant material which is applied to the outer surface of the shaft in the area swept by seal teeth 36." That, of course, is the full 360° portion of the shaft opposing the teeth 36.

SUMMARY OF THE INVENTION

It is the purpose of the invention to provide a means for eliminating most of the harmful effects of seal rubs. The invention provides a small cutting or grinding patch on a small portion of the rotating parts that, during a momentary rub, will cut or grind the seal tooth away to leave it sharp without a mushrooming effect. Further, it will prevent damage on the rotating surface where rubbing in the past has caused grooves and other forms of surface damage such as cracks and increased stress.

The term "small patch" is used to indicate that the grinding material is deposited on only a limited area on the rotating component, as opposed to a complete blanketing of the rotating component with the grinding material.

For instance, if the coating is applied to a shaft as a 360° deposit in opposition to a seal tooth, when rubs occur, contact is constant and the lower end of the tooth becomes mushroomed as a result of molten conditions where the rub is occurring.

With the small patch of the invention, contact of the tooth with the coating is not constant, but is intermittent, so that the tooth is cut, not melted, wherefore mushrooming does not occur, and the tooth remains sharp and thin.

The "small patch" geometry of the invention intermittently creates the condition of a cutting means that shaves material from the packing's teeth without generating high local temperatures, such as exist in rubbing conditions obtained by the 360° coating of Martin et al patent #5,211,535. Such 360° coatings (or no coating) have existed in turbines for over 40 years. No one, in all that time, has suggested the "small patch" of the invention which creates a local cutting tool and eliminates the abrasion method of wearing away seal teeth when rubs occur.

DESCRIPTION OF THE PREFERRED EMBODIMENTS

Figure 1:
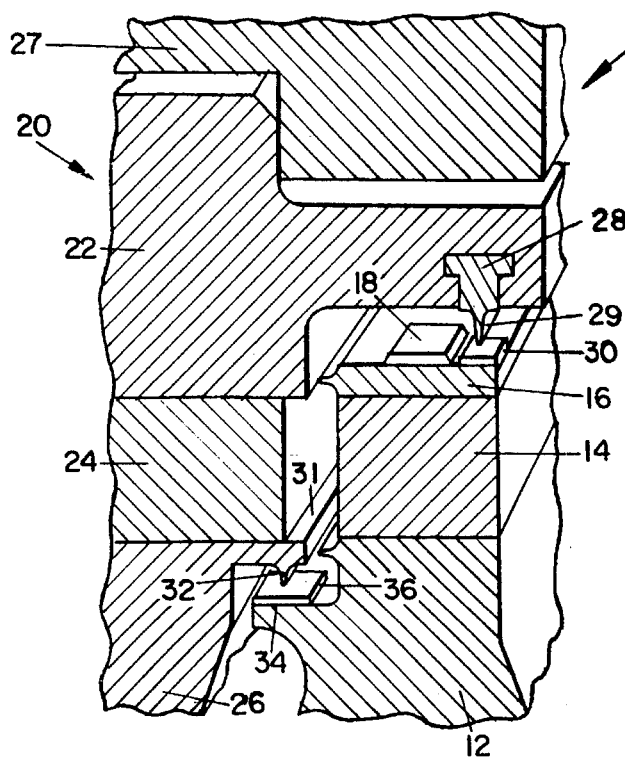
FIG. 1 is a fragmentary, perspective, cross sectional view of a typical turbine stage, showing seal rub protection means embodying a preferred form of the invention as used on a bucket cover and on a dovetail and positioned in opposition to a tip seal and a root seal respectively.

With reference to FIG. 1 a typical turbine stage 10 includes a rotatable wheel 12 which holds a row of buckets 14. Fastened to the buckets is a cover 16 held to the bucket outer surface by a series of tenons or rivets 18, only one of which is shown.

Stationary parts include a diaphragm 20 comprised of an outer ring 22, a circle of nozzles 24, and an inner ring 26. A casing or shell 27 supports and aligns the stationary parts to the rotating parts.

Supported in diaphragm 20 by outer ring 22 to a small clearance with buckets cover 16 is a tip seal 28 having a tooth 29 that is designed to minimize leakage over the top of the bucket cover.

Installed on a small portion of bucket cover 16 is a small patch 30 of very hard material such as chrome carbide selected to have the ability to cut or grind tooth 29 of tip seal 28 in the event of a momentary local rubbing contact.

Since contact of tooth 29 with patch 30 is intermittent and not constant, the cutting action leaves the tip seal tooth corners sharp without causing the end of the tooth to become widened or mushroomed and also prevents grooving or other damage to the bucket cover outer surface.

Figure 6:
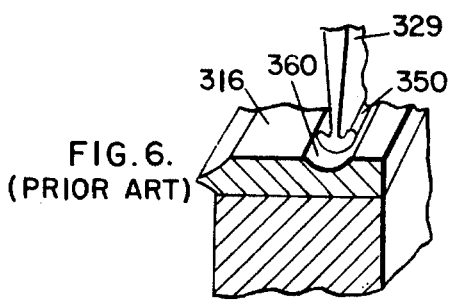
FIG. 6 is a fragmentary, perspective, cross sectional view of a prior art tip seal and bucket cover illustrating the type of damage which frequently occurs.

Such mushrooming and grooving is illustrated in FIG. 6, wherein a prior art seal tooth 329 has become rounded or mushroomed at its lower end as at 350 and a bucket cover 316 has become grooved as at 360 as a result of metal to metal high speed, high pressure, constant contact that causes high temperatures and local melting.

Even should mushrooming of the lower end of seal tooth 329 not occur, the lower end of the tooth will become rounded, increasing its flow coefficient by at least 20% or more, a highly undesirable result.

Referring again to FIG. 1, root seal 31 on inner ring 26 of diaphragm 20 has a tooth 32 that is designed to minimize leakage over the top of a dovetail surface 34 on the outer surface of wheel 12.

Installed on a small portion of dovetail surface 34 is a small patch 36 similar to patch 30 of very hard material such as chrome carbide selected to have the ability to cut or grind tooth 32 of root seal 31 in the event of a momentary local rubbing contact. The cutting leaves root seal tooth 32 sharp and thin rather than mushroomed and also prevents grooving or other damage to dovetail surface 34.

With both patches 30 and 36 the material is anticipated to be spray coated on only a small area of the rotating parts; but any method that achieves a firm bond would be satisfactory. A few mils of thickness and an inch or so of circumferential length is considered about right, but longer, shorter, or thicker coatings will often be needed so long as they are not continuous, depending on the magnitude of tooth material deemed necessary for grinding away.

However, in no event is the entire surface of the rotating part which opposes the seal tooth covered with the material, since that would result in objectionable melting and mushrooming of the seal teeth.

Figure 2:
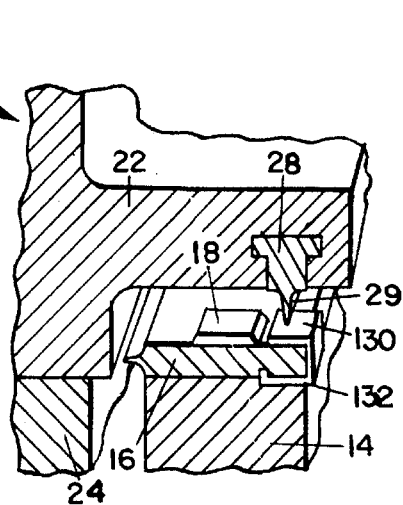
FIG. 2 is a fragmentary, perspective, cross sectional view similar to FIG. 1 showing a first modified form of seal rub protection means as used on a bucket cover and positioned in opposition to a tip seal.

FIG. 2 shows a first modified form of the invention wherein a small patch 130 of very hard grinding material such as chrome carbide is provided as an upper arm of a U-shaped clip 132 secured to bucket cover 16 so as to hold the patch at a location opposite to tooth 29 of tip seal 28 for intermittent grinding purposes similar to small patches 30 and 36 of FIG. 1.

Figure 3:
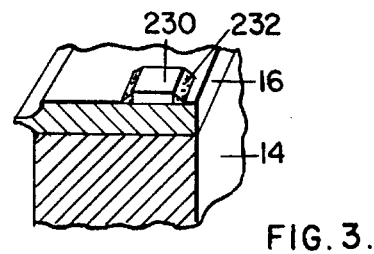
FIG. 3 is a fragmentary, perspective, cross sectional view of a second modified form of seal rub protection means as used on a bucket cover.

FIG. 3 shows another modified form of the invention wherein a small patch 230 of very hard grinding or cutting material such as chrome carbide is fastened to bucket cover 16 by welding or brazing, as indicated at 232 for intermittent grinding purposes similar to small patches 30, 36 of FIG. 1 and small patch 130 of FIG. 2.

Figure 4:
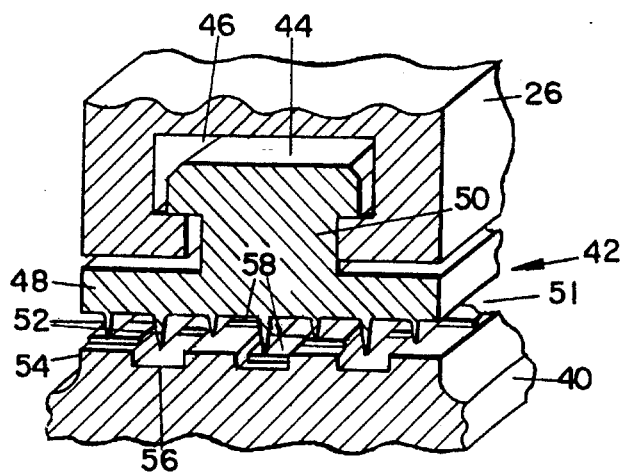
FIG. 4 is a fragmentary, perspective, cross sectional view showing seal rub protection means embodying the invention as used on a turbine shaft and positioned in opposition to a typical packing ring seal.

FIG. 4 shows the invention as applied to a rotatable turbine shaft 40 which opposes a ring of labyrinth packing 42 depending from the lower end of stationary inner ring 26 of diaphragm 20.

Packing ring 42 has an upper portion 44 which is retained in a T-shaped groove 46 in inner ring 26 and a lower portion 48 connected by a neck 50 to upper portion 44 and depending from ring 26 into a free space 51 between ring 26 and turbine shaft 40.

Lower portion 48 of packing ring 42 includes a plurality of stepped depending teeth 52 that are disposed in opposition to circumferential portions 54 and 56 of turbine shaft 40 which are alternately stepped up and down in radius.

While high-low teeth 52 are shown, slanted or in-line teeth may also be employed.

The purpose of the packing is to minimize leakage along the shaft.

The shaft has alternating high-low lands 54 and 56 that oppose the packing teeth.

Should contact occur between the shaft lands and the seal teeth, the seal teeth wear and become mushroomed, while the shaft becomes grooved, similar to the mushrooming and grooving illustrated in FIG. 6.

To prevent this undesirable combination, small patches 58, similar to small patches 30 and 36 of FIG. 1, small patch 130 of FIG. 2, and small patch 230 of FIG. 3, of a hard grinding material such as chrome carbide are locally added to high-low lands 54 and 56 of shaft 40 and positioned in a staggered pattern in opposition to the lower ends of teeth 52.

The patches are a few mils thick, an inch or two long, and wide enough to oppose the teeth in the most extreme expected axial positions, but do not cover the entire surface of shaft 50.

Figure 5:
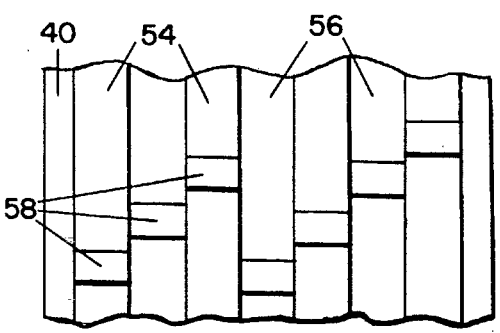
FIG. 5 is a fragmentary, top plan view of the turbine shaft of FIG. 4.

Considering that much of the surface of the shaft opposes packing teeth, it is advisable to locate the small patches 58 in a staggered pattern in a variety of circumferential positions as shown in FIG. 5 so that no axial strip of such material will exist along the shaft to cause possible temperature variations or imbalance, which would result in molten conditions and mushrooming of the packing teeth.

The brazing technique of FIG. 3 can also be used to affix the small patch 30 to bucket cover 16 to affix the small patch 36 to dovetail surface 34 of FIG. 1, or to affix the small patches 58 to the lands 54 and 56 of shaft 40 of FIG. 4.

I claim:

1. In a compressible rotating machine having stationary and rotating elements and employing seal teeth between the stationary and rotating elements capable of being rubbed, worn and damaged by the rotating elements, the improvement which comprises a small patch of hard, cutting and grinding material on a small portion of the rotating element disposed in opposition to the seal teeth and capable of intermittent cutting of the seal teeth without melting and mushrooming during temporary contact so as to leave them sharp and thin and preventing harm such as grooving to the surface of the rotating elements.

2. In a compressible rotating machine according to claim 1, wherein the seal teeth are formed on a tip seal on a diaphragm of the stationary element and the small patch of hard cutting and grinding material is on a small portion of a cover of a bucket on the rotating elements.

3. In a compressible rotating machine according to claim 1, wherein the seal teeth are formed on a root seal on a diaphragm of the stationary element and the small patch of hard, cutting and grinding material is on a small portion of a dovetail surface of a wheel of the rotating elements.

4. In a compressible rotating machine according to claim 1 wherein the seal teeth are formed on a packing ring having a plurality of teeth on a diaphragm of the stationary elements and the small patches of hard, cutting and grinding material disposed in opposition to the seal teeth are provided in a variety of circumferential positions in a staggered pattern so that no axial strip of grinding material exists along the shaft to cause temperature variations resulting in molten conditions and mushrooming of the seal teeth.

5. In a compressible rotating machine according to claim 1, wherein the small patch of hard, cutting and grinding material is chrome carbide.

6. In a compressible rotating machine according to claim 1, wherein the small patch of hard, cutting and grinding material is spray coated to the rotating elements and is of relatively small thickness and length.

7. In a compressible rotating machine according to claim 1, wherein the small patch of hard, cutting and grinding material is clamped to the rotating elements.

8. In a compressible rotating machine according to claim 1, wherein the small patch of hard, cutting and grinding material is brazed to the rotating elements.

* * * * *